(12) United States Patent
Torresani

(10) Patent No.: US 6,520,233 B2
(45) Date of Patent: Feb. 18, 2003

(54) HEAVY-TRANSPORT RADIAL TIRE WITH BELT CUSHION GUM STRIP BETWEEN TREAD BELT AND SHOULDER CUSHION

(75) Inventor: Apollinare Torresani, Rome (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/871,634

(22) Filed: Jun. 4, 2001

(65) Prior Publication Data

US 2002/0007890 A1 Jan. 24, 2002

(30) Foreign Application Priority Data

Jun. 9, 2000 (IT) ........................................ TO00A0559

(51) Int. Cl.[7] .............................. B60C 9/08; B60C 9/18
(52) U.S. Cl. ........................ 152/532; 152/537; 152/564
(58) Field of Search ................................. 152/532, 537, 152/569

(56) References Cited

U.S. PATENT DOCUMENTS 4,062,393 A * 12/1977 Bertrand ..................... 152/532
4,082,132 A    4/1978 Arai et al.

FOREIGN PATENT DOCUMENTS

| EP | 0 256 247 B1 | 9/1991 |
|---|---|---|
| EP | 0 285 695 B1 | 3/1992 |

OTHER PUBLICATIONS

Mechanics of pneumatic tires, ed. Samuel Clark. Washington D.C., U.S. Department of Transportation, 1981. p. 882.*

* cited by examiner

Primary Examiner—Adrienne C. Johnstone
(74) Attorney, Agent, or Firm—Meredith E. Palmer

(57) ABSTRACT

A heavy-transport radial tire (1) having two annular shoulder cushions (14) made of elastomeric material with a relatively low M200% modulus, and each located at a respective shoulder (9) between a reinforced body ply (4) and a tread belt (10) defined by a number of superimposed tread plies (11); and wherein a belt cushion gum strip (18), made of elastomeric material with a relatively high M200% modulus but lower than the M200% modulus of a coating skim (13) of the reinforced tread plies (11), is interposed between each annular shoulder cushion (14) and the tread belt (10) to cover at least the respective edges (20, 22) of those (11a, 11b) of the reinforced tread plies (11) facing the annular shoulder cushion (14).

9 Claims, 2 Drawing Sheets

HEAVY-TRANSPORT RADIAL TIRE WITH BELT CUSHION GUM STRIP BETWEEN TREAD BELT AND SHOULDER CUSHION

FIELD OF THE INVENTION

The present invention relates to a heavy-transport radial tire. In particular, the present invention relates to a heavy-transport TBR (Truck and Bus Radial) tire.

BACKGROUND OF THE INVENTION

In tire manufacturing, a heavy-transport radial tire is known comprising a radial carcass defined by a body ply reinforced with normally steel wires coated with elastomeric material; a tread having two lateral shoulders; and a tread belt interposed between the tread and carcass and defined by a pack of superimposed tread plies reinforced with wires inclined with respect to the radial wires of the body ply and having two opposite outer coating skims of elastomeric material.

Radial tires of the above type also have, at each shoulder, an annular shoulder cushion made of elastomeric material with a relatively low M200% modulus—at any rate lower than the M200% modulus of the normally similar elastomeric materials coating the tread plies and body ply—and which acts as a shock absorber between a relative lateral edge of the tread belt and the body ply, and is inserted for the dual purpose of increasing the wear resistance of the tread and the working life of the carcass. The two annular shoulder cushions, in fact, provide for distributing the internal stress of the carcass (which would otherwise be concentrated at the equatorial region of the tread) over the whole tread surface, so as to maximize the tread print and so minimize the specific forces applied to each point on the tread and the wear produced by such forces. The two annular shoulder cushions also provide for protecting the carcass by dissipating the forces exchanged between the carcass—as this expands under relatively high operating temperatures and stress—and the tread belt, which by nature is substantially inextensible.

Experience has shown that, in radial tires of the above type, relatively high temperatures and pressures under severe working conditions result—at least at the thinnest portion of each annular shoulder cushion, ie. the portion adjacent to the equatorial plane of the tire—in substantially total compression of the annular shoulder cushions, and in total failure of the cushions to absorb cyclic circumferential expansion of the body ply. Being practically inabsorbable by the tread belt, cyclic circumferential expansion of the body ply results in fatigue shearing stress of the tread belt capable of detaching the coating skims from the relative reinforcing wires, and of generating microfractures, which, originating at the point of detachment, spread through the coating skims and, encountering practically no obstacles along the way, eventually through the annular shoulder cushions until the tread belt eventually comes away from the body ply.

SUMMARY OF THE INVENTION

One aspect of the present invention is a heavy-transport TBR tire designed to eliminate the aforementioned drawback.

More specifically, the heavy-transport TBR tire not only minimizes the risk of the reinforcing wires coming away from the coating skims in the tread plies and, hence, microfractures spreading through the coating skims, but also minimizes the risk of any microfractures which might still be formed spreading through the annular shoulder cushions.

According to the present invention, there is provided a heavy-transport radial tire comprising a radial carcass, in turn, comprising a body ply reinforced with radial wires coated with a first elastomeric material; a tread having two lateral shoulders; a tread belt interposed between the tread and the carcass and comprising a pack of superimposed tread plies reinforced with wires inclined with respect to the radial wires of the body ply and coated with a second elastomeric material having an M200% modulus similar to that of said first elastomeric material, each tread ply having two lateral edges, each adjacent to a respective said shoulder; and, at each said shoulder, an annular shoulder cushion of a third elastomeric material of a relatively low M200% modulus with respect to the M200% moduli of said first and said second material; and also comprising a belt cushion gum strip made of a fourth elastomeric material of a relatively high M200% modulus, but ranging between the M200% moduli of said first and said second material, on the one hand, and the M200% modulus of said third material, on the other, and interposed between the relative annular shoulder cushion and the tread belt to cover at least the lateral edges of those of the tread plies facing the annular shoulder cushion.

BRIEF DESCRIPTION OF THE DRAWING

A non-limiting embodiment of the invention will be described by way of example with reference to the accompanying drawings, in which.

EMBODIMENTS OF THE INVENTION

Figure 1:
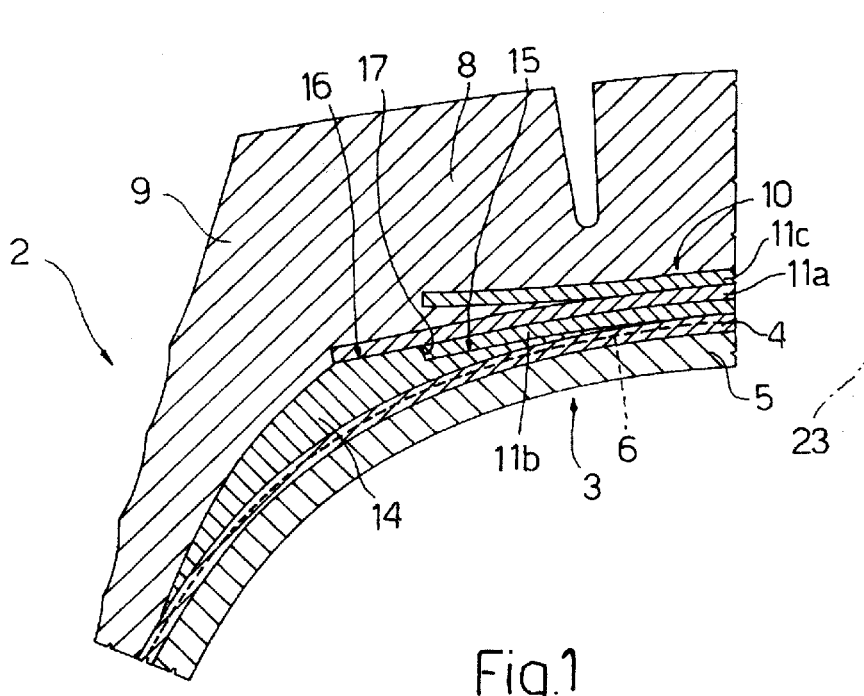
FIG. 1 shows a partial cross section of a known tire in the art.
Figure 2:
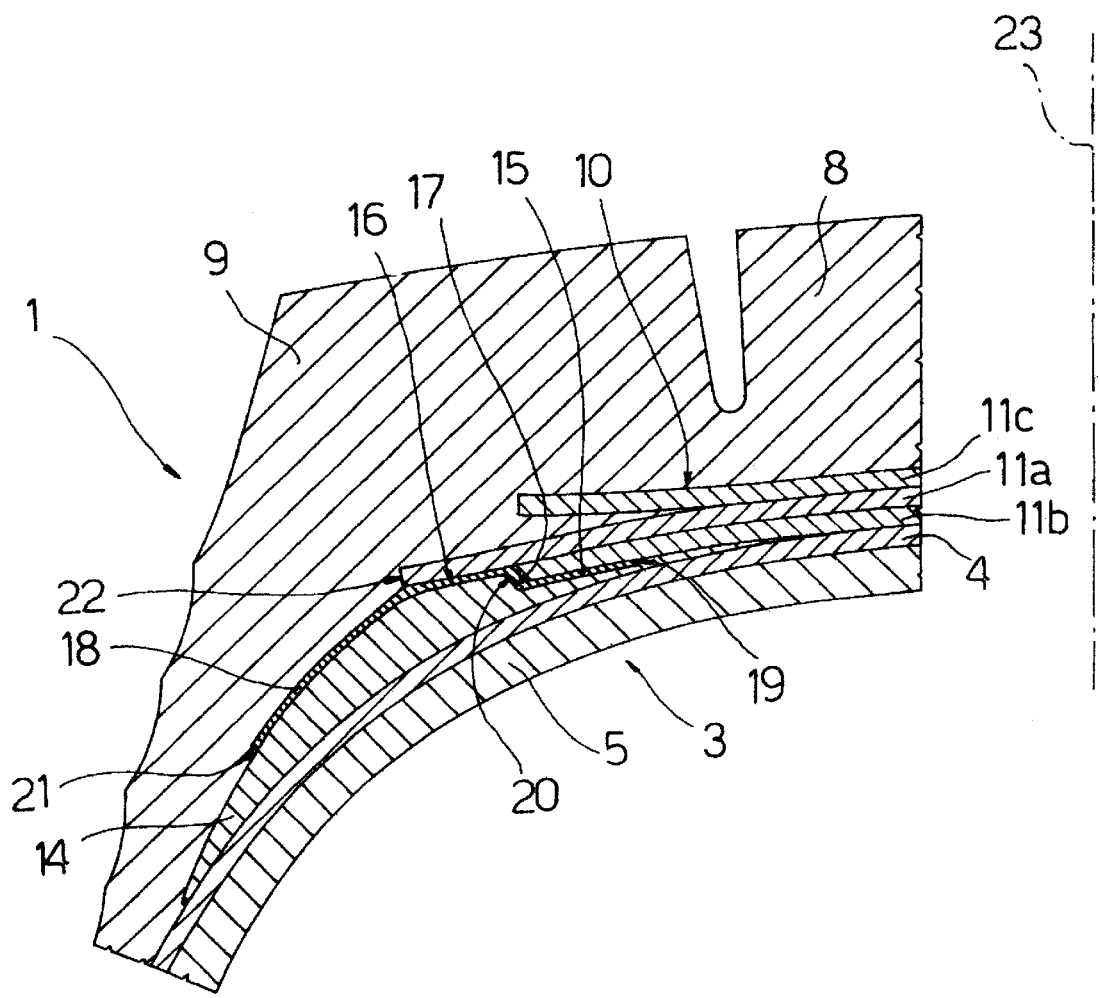
FIG. 2 shows a partial cross section of an embodiment of a tire in accordance with the present invention.

With reference to FIGS. 1 and 2, FIG. 2 shows a TBR tire (1) in accordance with the teachings of the present invention, and FIG. 1 shows a known TBR tire (2).

Tires 1 and 2 both comprise a radial carcass 3 defined by a body ply 4, which is lined with an innerliner 5 impermeable to air, and is reinforced with wires 6 (shown in FIG. 3 with reference to tire 1, but also present in tire 2) normally made of steel and distributed over a layer having two opposite outer coating skims 7 of elastomeric material. Each of tires 1 and 2 also comprises a tread 8 having two lateral shoulders 9; and a tread belt 10 interposed between tread 8 and carcass 3, and defined by a pack of three superimposed tread plies 11. The intermediate tread ply 11, indicated 11a, is wider than the other two, indicated 11b and 11c, and the reinforced ply 11b is located facing carcass 3.

Tread plies 11 are reinforced with wires 12 (shown in FIG. 3 with reference to tire 1, but also present in tire 2) inclined with respect to the radial wires 6 of body ply 4 and distributed, in each tread ply 11, over a layer having two opposite outer coating skims 13 of elastomeric material.

Each of tires 1 and 2 also comprises two annular shoulder cushions 14 of elastomeric material, each of which has a section substantially in the form of an isosceles triangle, and is located at a respective shoulder 9. More specifically, each annular shoulder cushion 14 has two depressed outer annular surfaces 15 and 16; surface 15 has a smaller outside diameter than surface 16, is connected to surface 16 by an annular shoulder 17, and extends along a respective annular portion of the inner surface of tread ply 11b; annular shoulder 17 extends in contact with a lateral edge of tread ply 11b; and surface 16 extends along a respective annular portion of the inner surface of tread ply 11a projecting laterally beyond tread ply 11b.

Annular shoulder cushions 14 are made of a material having a relatively low M200% modulus, at any rate lower than the M200% modulus of the normally similar or identical elastomeric materials of coating skims 7 and 13 of tread plies 11 and body ply 4.

In tire 2 known to those in the art, tread plies 11a and 11b are placed directly contacting annular shoulder cushions 14; whereas, in tire 1 of the present invention, between each annular shoulder cushion 14 and body plies 11a and 11b, i.e. the body plies directly contacting annular shoulder cushions 14 in tire 2, there is inserted a belt cushion gum strip 18 made of elastomeric material with a relatively high M200% modulus, but ranging between the M200% moduli of the materials of coating skims 7 and 13, on the one hand, and the M200% modulus of the material of annular shoulder cushions 14, on the other hand.

More specifically, belt cushion gum strip 18 is made of elastomeric material having an M200% modulus, expressed in Mpa, ranging between 5 and 15 and preferably between 8 and 11.

As regards dimensions, each belt cushion gum strip 18 is 0.2 to 1.2 and preferably 0.3 to 0.9 mm thick, is preferably wider than the distance between an outer edge of the narrowest tread ply 11 (ply 11b in the example) and a corresponding lateral edge of the widest tread ply 11 (ply 11a in the example), and at any rate is wide enough to cover the respective lateral edges of all the tread plies 11 directly contacting respective annular shoulder cushion 14 in tire 2.

Figure 3:
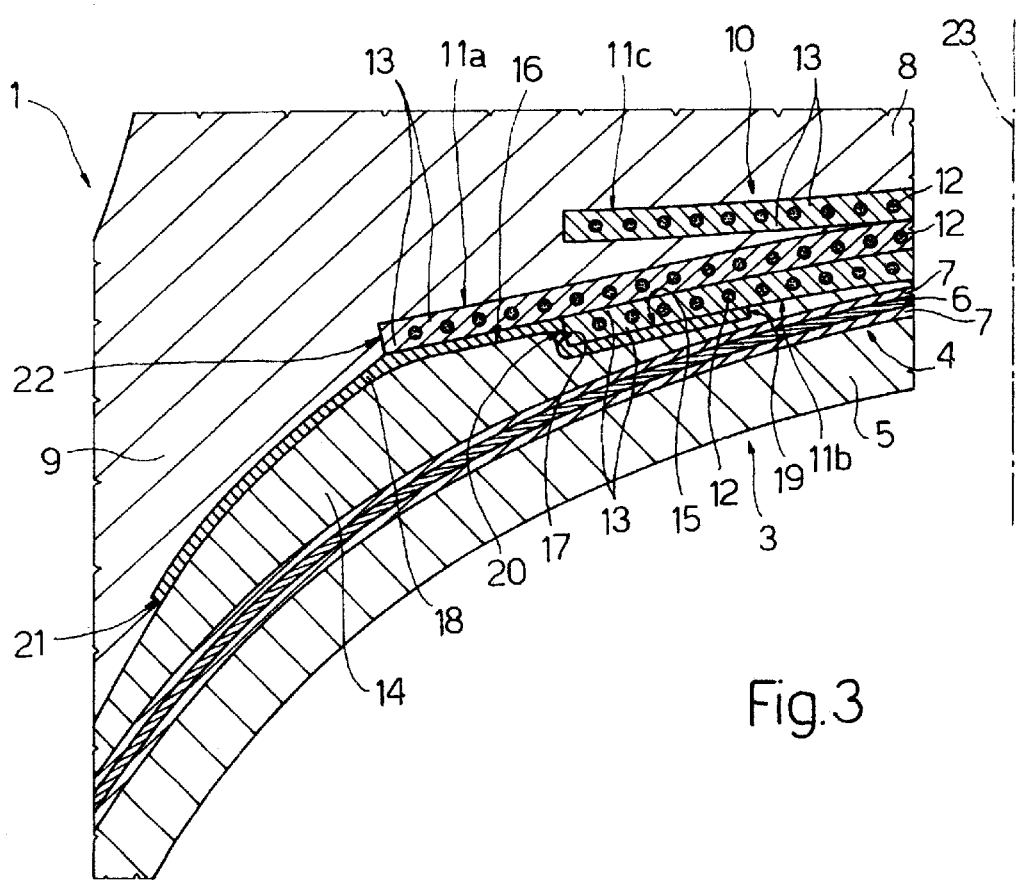
FIG. 3 shows a larger-scale detail of FIG. 2.

In the example shown in FIGS. 2 and 3, each belt cushion gum strip 18 is mounted on the outer surface of respective annular shoulder cushion 14, with an inner lateral edge 19 inwards of a respective lateral edge 20 of tread ply 11b, and with an outer lateral edge 21 outwards of a respective outer lateral edge 22 of tread ply 11a.

An example composition of the mixtures of annular shoulder cushions 14 (M14), of belt cushion gum strips 18 (M18), and of coating skims 7 (M7) and 13 (M13) is shown in the Table below:

TABLE 1

|  | M14 | M18 | M13 | M7 |
| --- | --- | --- | --- | --- |
| Natural rubber | 100 | 100 | 100 | 100 |
| Carbon black | 32.5 | 55.0 | 65.0 | 65.0 |
| Zinc oxide | 3.5 | 6.0 | 9.0 | 9.0 |
| Sulfur | 3.0 | 6.0 | 6.0 | 6.0 |
| Accelerant | 0.6 | 0.8 | 0.8 | 0.8 |
| Stearic acid | 1 | 3 | 2 | 2 |
| Aromatic oil | 12 | 8 | 4 | 4 |
| Wax | 1 | 2.5 | 2.5 | 2.5 |
| TBBS | 1 | 1 | 0.6 | 0.6 |
| MBTS | 0.5 |  | 0.3 | 0.3 |
| DPG | 1.5 |  | 0.2 | 0.2 |
| 6PPD | 1 | 5 | 5 | 5 |

The characteristics of the components in the above Table are:
Natural rubber = TSR20 (Thaitech Rubber) type;
Zinc oxide = OSSIDO DI ZINCO SIGGILLO VERDE (ZINOX SRL) type;
Sulfur = GROUND SULPHUR (SOLVAY BARIUM STRONZIUM GMBH) type;
Wax = ANTIOZONANT WAX 6065 (SCHUMAN SASOL GMBH & CO KG) type;
Stearic acid = INDUSTRENE R (WITCO) type;
Aromatic oil = ESAR 90DEN (AGIP PETROLI) type;
TBBS = SANTOCURE TBBS (FLEXSIS);
MBTS = PERKACIT MBTS (FLEXSIS);
DPG = PERKACID DPG (FLEXSIS);
6PPD = SANTOFLEX 6PPD (FLEXSIS).

With reference to the example:
antioxidizing systems other than those indicated may be used, but do not exceed 1 phr in quantity;
the plasticizing, curing and activating systems may be replaced with others indicated as equivalents in component makers' catalogues.

Table 2 below shows the results of laboratory tests of specimens of the above three mixtures (M13 and M7 being the same):

TABLE 2

|  | M14 | M18 | M13 | M7 |
| --- | --- | --- | --- | --- |
| Ultimate elongation | 554% | 495% | 395 | 395 |
| Modulus (200% elongation) in Mpa | 5.71 | 10.00 | 12.37 | 12.37 |

With reference to the above Table 2, the M200% modulus was measured using the ETM 106 method equivalent to ASTM D412-97.

Without being limited to a particular theory, inserting belt cushion gum strips 18 between tread belt 10 and carcass 3 of tire 1 provides for absorbing the fatigue shearing stress otherwise transmitted to tread plies 11, and for reducing stress at edges 20 and 22. This therefore not only reduces the possibility of coating skims 13 of tread plies 11 coming away from respective wires 12, thus resulting in possible microfractures through coating skims 13, but also slows down the spread of any microfractures which might still be formed. As compared with annular shoulder cushions 14, in fact, belt cushion gum strips 18 provide for better resisting the spread of such microfractures, and, at any rate, tend to so direct them as to prevent the tread belt from detaching from body ply 4.

In variations not shown, belt cushion gum strips 18 can be wide enough to touch at the equatorial plane 23 of tire 1 (in which case, the two belt cushion gum strips 18 may be replaced by a single belt cushion gum strip twice as wide and interposed between carcass 3 and the whole of tread belt 10) and/or to cover the whole of the outer surfaces of annular shoulder cushions 14.

The invention is not limited to the above embodiments. The claims follow.

What is claimed is:

1. A heavy-transport radial tire (1) comprising:
   a radial carcass (3), in turn, comprising
      a body ply (4) reinforced with radial wires (6) coated with a first elastomeric material;
      a tread (8) having two lateral shoulders (9);
      a tread belt (10) interposed between the tread (8) and the carcass (3) and comprising a pack of superimposed tread plies (11) reinforced with wires (12) inclined with respect to the radial wires (6) of the body ply (4) and coated with a second elastomeric material having an M200% modulus similar to that of said first elastomeric material,
      each tread ply (11) having two lateral edges (20, 22), each adjacent to a respective said shoulder (9); and, at each said shoulder, an annular shoulder cushion (14) of a third elastomeric material of a relatively low M200% modulus with respect to the M200% moduli of said first and said second material; and
      a belt cushion gum strip (18) made of a fourth elastomeric material of a relatively high M200% modulus, but ranging between the M200% moduli of said first and said second material on the one hand, and the M200% modulus of said third material, on the other, and interposed between the respective annular shoulder cushion (14) and the tread belt (10) to cover at least the lateral edges (20, 22) of those (11b, 11a) of the tread plies (11) facing the annular shoulder cushion (14).

2. The tire of claim 1,
wherein each belt cushion gum strip (18) is of a thickness ranging between 0.2 and 1.2 mm.

3. The tire of claim 1, wherein each belt cushion gum strip (18) is of a thickness ranging between 0.3 and 0.9 mm.

4. The tire of claim 1,
wherein said fourth elastomeric material has an M200% modulus, expressed in MPa, ranging between 5 and 15.

5. The tire of claim 1,
wherein said fourth elastomeric material has an M200% modulus, expressed in MPa, ranging between 8 and 11.

6. The tire of claim 1,
wherein said tread plies (11) are centered with respect to an equatorial plane (23) of the tire and are of different widths; and
wherein each said belt cushion gum strip (18) being of a width greater than a distance between a lateral edge (20) of the narrowest tread ply (11*b*) and a corresponding lateral edge (22) of the widest tread ply (11*a*).

7. The tire of claim 6,
wherein each belt cushion gum strip (18) is of a thickness ranging between 0.2 and 1.2 mm.

8. The tire of claim 6,
wherein each belt cushion gum strip (18) is of a thickness ranging between 0.3 and 0.9 mm.

9. The tire of claim 6,
wherein said fourth elastomeric material has an M200% modulus, expressed in MPa, ranging between 5 and 15.

* * * * *